United States Patent
Bowden

[15] 3,673,199

[45] June 27, 1972

[54] MANUFACTURE OF BIPYRIDYLS

[72] Inventor: Roy Dennis Bowden, Runcorn, England

[73] Assignee: Imperial Chemical Industries Limited, London, England

[22] Filed: April 22, 1970

[21] Appl. No.: 31,016

[30] Foreign Application Priority Data

May 9, 1969 Great Britain.......................23,780/69

[52] U.S. Cl. .................260/296 D, 260/295 AM, 260/294.9, 260/293.69
[51] Int. Cl. ........................................................C07d 31/42
[58] Field of Search ......260/290 P, 296 D, 295 AM, 294.8 G, 260/294.9

[56] References Cited

UNITED STATES PATENTS

| | | | |
|---|---|---|---|
| 2,765,310 | 10/1956 | Horrobin | 260/290 P |
| 2,765,311 | 10/1956 | Horrobin et al. | 260/290 P |

*Primary Examiner*—Alan L. Rotman
*Attorney*—Cushman, Darby & Cushman

[57] ABSTRACT

A process for the manufacture of bipyridyls which comprises heating a bipiperidyl or a substituted pyridine derivative wherein the substituent is a piperidyl group or an open-chain group containing one or more nitrogen atoms, in the vapour phase at a temperature of at least 200° C. in the presence of a dehydrogenation catalyst.

9 Claims, No Drawings

MANUFACTURE OF BIPYRIDYLS

This invention relates to the manufacture of bipyridyls, notably 4,4'-bipyridyls.

According to the present invention we provide a process for the manufacture of bipyridyls which comprises heating the corresponding substituted pyridine derivative or bipiperidyl in the vapor phase in the absence of oxygen and ammonia at a temperature of at least 200° C. in the presence of a dehydrogenation catalyst, the substituted pyridine derivative having as substituent a piperidyl group or a group of the general formula —C(R)(R$_1$)(R$_2$) wherein R represents a hydrogen atom, a halogen atom, a hydroxy group, an alkoxy group and an amino group, R$_1$ represents a group of the general formula —CH$_2$CN, —CH$_2$CON(R$_3$)(R$_4$) or —CH$_2$CH$_2$N(R$_5$)(R$_6$) wherein R$_3$, R$_4$, R$_5$ and R$_6$ each represents a hydrogen atom or an alkyl, alkene, aryl, alkaryl, aralkyl or cycloaliphatic group, and R$_2$ represents a group as defined in respect of R$_1$ or a group of the general formula CH$_n$(XR$_7$)$_{2-n}$ CH$_m$(XR$_{83-m}$ wherein X represents an atom of oxygen or sulphur, $n$ is 0, 1 or 2 and $m$ is 1 or 2, and R$_7$ and R$_8$ each represents a hydrogen atom or an alkyl, alkene, aryl, alkaryl, aralkyl or cycloaliphatic group.

The substituent of the substituted pyridine derivative may be in the 2-, 3- or 4-position in the pyridine nucleus, and in the case where the substituent is a piperidyl group this may be attached to the pyridine nucleus in the 2-, 3- or 4-position in the piperidyl nucleus.

The substituted pyridine derivative in the vapor phase is heated at a temperature of at least 200° C. in the presence of the dehydrogenation catalyst. Preferably the temperature is at least 300° C., for example 350°–450° C. The substituted pyridine derivative can be vaporized simply by heating it to the required temperature and if desired this can be effected in the presence of the dehydrogenation catalyst. Preferably, however, the pyridine derivative is vaporized prior to contacting it with the catalyst and in this case vaporization is conveniently effected by dropping the pyridine derivative in a stream of droplets on to a hot surface, for example in a vaporizer. Some of the pyridine derivatives are tacky, viscous liquids or solids at ordinary temperatures and these are conveniently dissolved in a solvent prior to vaporization. Examples of suitable solvents for this purpose are water and alcohols, especially lower aliphatic alcohols and particularly methanol, and trans-hydrogenation solvents for example nitriles, nitrobenzene and benzene.

The pressure at which the substituted pyridine derivative is heated can conveniently be atmospheric, although higher or lower pressures may be employed if desired. A technique which we have found to be particularly useful is to pass the pyridine derivative in the vapor phase continuously through a bed of the catalyst contained in a glass tube.

Any dehydrogenation catalyst may be employed, advantageously in a finely divided form. The catalyst may be supported or unsupported, although we prefer to employ a supported catalyst so as to promote intimate contact of the substituted pyridine derivative with the catalyst. Examples of suitable catalyst are nickel, cobalt, copper, chromium, copper chromite, chromia, noble metals notably platinum or palladium, or oxides of noble metals. Examples of suitable catalyst supports are alumina, silica, silica-alumina and magnesia.

The bipyridyls produced by the process can be isolated from the reaction products by known techniques. For example the gaseous reaction product can be condensed and the bipyridyl isolated from the condensate by solvent extraction and/or fractional distillation, if desired under reduced pressure. If the reaction product is 4,4'-bipyridyl and the product mixture contains water, the 4,4'-bipyridyl is in the form of its hydrate which is solid and can be separated by filtration.

The process of the invention may produce the bipyridyl directly or it may produce a piperidyl pyridine wherein the N-atom of the piperidyl nucleus is substituted, for example it carries an alkyl group. The piperidyl pyridine can be readily converted to the bipyridyl in a subsequent dehydrogenation reaction.

The process can be carried out batchwise but has the advantage that it can be carried out as a continuous operation. It is particularly suitable for the production of 4,4'-bipyridyls although other isomers, for example 2,2'-, 2,4'-2,3'- and 3,4'-bipyridyls can be obtained by suitable choice of the starting material.

The invention is illustrated but in no way limited by the following examples:

EXAMPLES 1 to

The experimental procedure in each example was as follows:

A catalyst bed was prepared from a pelleted form of the catalyst (see below) to the specified depth in a vertical glass reactor tube of internal diameter 1 inch. The tube was fitted with a central thermocouple pocket and contained Raschig rings above the catalyst bed. The Raschig rings did not completely fill the tube. The tube was positioned in a vertical furnace maintained at the appropriate temperature.

The substituted pyridine was dissolved in water or methanol (see the table below) and the solution was fed to the top of the reactor tube where it was vaporized on contact with the Raschig rings. The vapors were passed downwardly through the catalyst bed. The vapors were mixed with nitrogen for passage through the catalyst bed.

The reactor effluent was condensed and the condensate if liquid (as in the majority of the experiments) was analyzed by gas/liquid chromatography using standard techniques. Where the condensate was a solid this was dissolved in methanol and the solution was analyzed.

In the table the catalyst is designated by a reference letter A, B or C:

A. Activated copper oxide/ chromia (ICI 26–3).

B. Catalyst A which immediately prior to use had been treated with a mixture of nitrogen (500 mls/minute) and hydrogen (60 mls/minute) for 2 hours at 350° C.

C. 0.5 percent platinum on 50 percent alumina/ 50 percent alumina-silica (Crosfields 77).

The reaction conditions and results are shown in the table below, in which "Dilutions" and "Solvent" refer to the starting material which is vaporized.

| Example No. | Pyridine derivative | Catalyst | Bed length (inches) | Temperature (° C.) | Time (min.) | Dilutions (g./ml.) | Solvent | N$_2$ (ml./min.) | Conversion percent [1] |
|---|---|---|---|---|---|---|---|---|---|
| 1 | 4-(4-pyridyl) piperidine | A | 3 | 350 | 150 | 4.6/50 | CH$_3$OH | 200 | 63 |
| 2 | 3-(4-pyridyl)-1,5-bis dimethylaminopentane | A | 3 | 340 | 95 | 4.3/50 | H$_2$O | 500 | 23 |
| 3 | 3-(4-pyridyl)-5-diethyl aminopentan-1-ol | A | 3 | 350 | 50 | 1.1/25 | H$_2$O | 500 | 12 |
| 4 | 3-(4-pyridyl)-5-diethyl aminopentane-1-thiol | A | 3 | 380 | 48 | 1.1/25 | CH$_3$OH | 500 | 7 |
| 5 | 3-(4-pyridyl)-1,5-bis dimethylaminopentane | B | 3 | 350 | 40 | 1.1/25 | H$_2$O | [2] 500 | 13 |
| 6 | 4-(2-pyridyl)-piperidine | C | 6 | 375 | 40 | 1.32/25 | CH$_3$OH | 500 | 10 |

[1] Conversion is to 4,4'-bipyridyl in Examples 1 to 5 and to 2,4'-bipyridyl in Example 6.
[2] Plus 60 H$_2$.

What we claim is:

1. A process for the manufacture of bipyridyls which consists essentially of heating the corresponding substituted pyridine derivative or bipiperidyl in the vapor phase in the absence of oxygen and ammonia at a temperature of at least 200° C. and up to 450° C. in the presence of a supported or unsupported dehydrogenation catalyst selected from the group consisting of nickel, cobalt, copper, chromium, copper chromite, chromia, and noble metals or their oxides and whereby the support is selected from the group consisting of alumina, silica, silica-alumina and magnesia, the substituted pyridine derivative having as substituent a piperidyl group or a group of the general formula $-C(R)(R_1)(R_2)$ wherein R represents a hydrogen atom, a halogen atom, a hydroxy group, a lower alkoxy group or an amino group, $R_1$ represents a group of the general formula $-CH_2CN$, $-CH_2CON(R_3-CH_2 \cdot CH_2N(R_5)(R_6)$ wherein $R_3$, $R_4$, $R_5$ and $R_6$ each represents a hydrogen atom or a lower alkyl or lower alkylene group, and $R_2$ represents a group as defined in respect of $R_1$, or a group of the general formula $-CH_n(XR_7)_{2-N} \cdot CH_m(XR_8)_{3-m}$ wherein X represents an atom of oxygen or sulphur, $n$ is 0, 1 or 2 and $m$ is 1 or 2, and $R_7$ and $R_8$ each represents a hydrogen atom or a lower alkyl or lower alkylene group.

2. A process as claimed in claim 1 wherein the temperature is at least 300° C.

3. A process as claimed in claim 2 wherein the temperature is from 350° to 450° C.

4. A process as claimed in claim 1 wherein the substituted pyridine derivative or bipiperidyl in the vapor phase is obtained by vaporization of a solution of the substituted pyridine derivative or bipyridyl.

5. A process as claimed in claim 4 wherein the solution which is vaporized is an aqueous solution.

6. A process as claimed in claim 4 wherein the solution which is vaporized is a solution in methanol.

7. A process as claimed in claim 1 wherein the substituted pyridine derivative or bipiperidyl is vaporized in the presence of the dehydrogenation catalyst.

8. A process as claimed in claim 1 wherein the substituted pyridine derivative or bipiperidyl in the vapor phase is diluted with nitrogen gas.

9. A process as claimed in claim 1 wherein the catalyst is employed in a finely-divided form.

* * * * *